United States Patent
Carlson et al.

[11] Patent Number: 6,094,803
[45] Date of Patent: Aug. 1, 2000

[54] WAFER PROCESSING TECHNIQUES FOR NEAR FIELD MAGNETO-OPTICAL HEAD

[75] Inventors: Carl Carlson, Pleasanton; Joseph Miceli, Saratoga; Hong Chen, San Jose; Chuan He, Fremont; Charles C. Cheng, Cupertino; Ross W Stovall, Fremont, all of Calif.

[73] Assignee: Read-Rite Corporation, Fremont, Calif.

[21] Appl. No.: 09/234,615

[22] Filed: Jan. 21, 1999

Related U.S. Application Data

[60] Provisional application No. 60/091,787, Jul. 6, 1998.

[51] Int. Cl.$^7$ ...................................................... H01F 41/02
[52] U.S. Cl. ................... 29/602.1; 369/44.15; 29/603.12
[58] Field of Search ............................ 29/603.12, 603.07, 29/603.03, 602.1; 369/13, 14, 15, 44.14, 44.15, 44.16, 44.22

[56] References Cited

U.S. PATENT DOCUMENTS

| | | | |
|---|---|---|---|
| 5,042,928 | 8/1991 | Richards | 359/728 |
| 5,125,750 | 6/1992 | Corle et al. | 350/819 |
| 5,497,359 | 3/1996 | Mamin et al. | |
| 5,689,480 | 11/1997 | Kino | 369/14 |

OTHER PUBLICATIONS

Lee, C.W., et al., "Feasibility Study on Near Field Optical Memory Using A Catadioptric Optical System", Optical Data Storage, Technical Digest Series, vol. 8, pp. 137–139, May 10–13 1998.

Mansipur, M., et al. "Parallel Processing", 42 Optics and Photonics News, pp. 42–45, Jun. 1998.

*Primary Examiner*—Carl E. Hall
*Attorney, Agent, or Firm*—Robert King; Samuel A. Kassatly

[57] ABSTRACT

A method of making and self-aligning a disk data storage read/write head that uses a catadioptric focusing device (or lens) having a high numerical aperture (NA), which does not introduce significant spot aberration on a storage medium. The manufacturing process of the head is carried out at a wafer level, and is facilitated significantly by the flatness of the focusing device. An exemplary manufacturing process is implemented as follows: A lens coil/plate is formed by molding a flat optical substrate to form the desired lens shapes. Coil cavities or depressions are formed simultaneously with the lens to accommodate a coil. Conductive plugs are formed in proximity to cutting lines for wire bonding attachment to the coil. A slider wafer is formed and bonded to the lens/coil wafer. Coils and pedestals are also formed on the lens/coil plate using thin-film processing techniques, and reflective surfaces are deposited on the bottom surface of the substrate, opposite the lens. The focusing device includes an incident surface, a reflective surface, a focal pedestal, and a body. The incident surface is generally flat and is comprised of a central diffractive, optically transmissive surface and a peripheral reflector. The peripheral reflector is comprised of a reflective-diffractive surface, or alternatively, a reflective-kinoform phase profile.

21 Claims, 17 Drawing Sheets

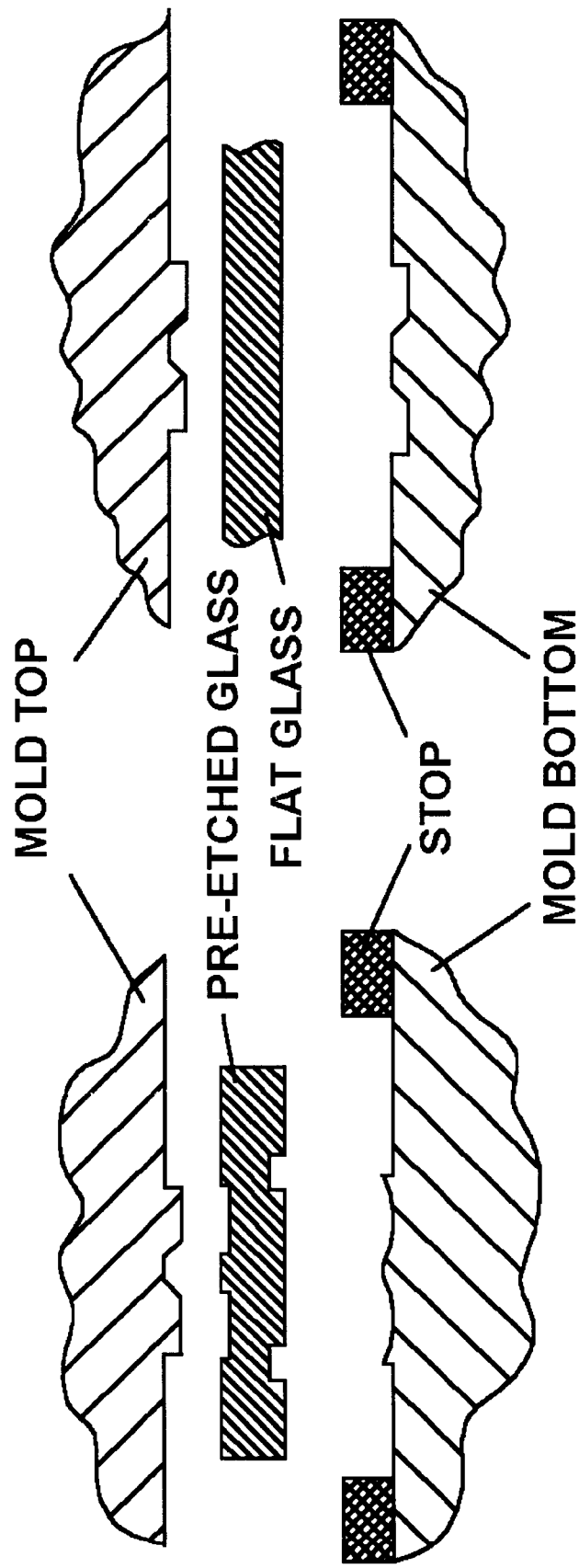

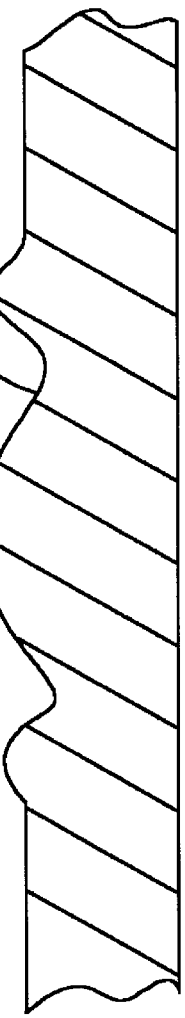

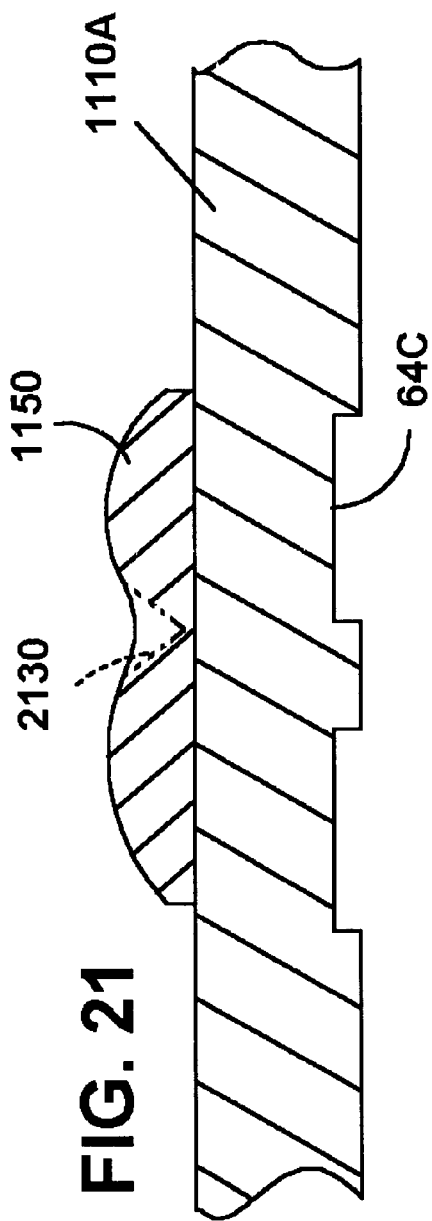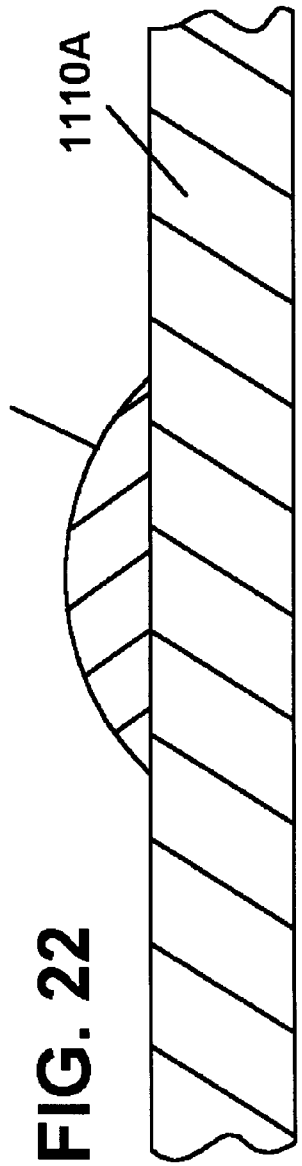

WAFER PROCESSING TECHNIQUES FOR NEAR FIELD MAGNETO-OPTICAL HEAD

CROSS-REFERENCE TO RELATED APPLICATIONS

This application claims the priority of the following U.S. provisional patent application, Ser. No. 60/091,787, filed on Jul. 6, 1998, titled "Near Field Magneto-Optical Head Made Using Wafer Processing Techniques", assigned to the same assignee as the present application, and incorporated herein by reference in its entirety.

BACKGROUND OF THE INVENTION

1. Field of the Invention

The present invention relates in general to data storage devices, and it particularly relates to methods for mass producing a disk drive head including a numerical aperture (NA) optical focusing device, using wafer processing techniques.

2. Description of Related Art

In a MO storage system, a thin film read/write head includes an optical assembly for directing and focusing an optical beam, such as a laser beam, and an electromagnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is generally inversely proportional to the numerical aperture (NA) of an objective lens forming part of the optical assembly, and proportional to the wavelength of the optical beam. As a result, the objective lens is selected to have a large NA. However, the NA in objective lenses can be 1 if the focusing spot were in air, thus limiting the spot size.

Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, June 1998. While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electromagnetic components are assembled to a slider body, and aligned for optimal performance.

SUMMARY OF THE INVENTION

One aspect of the present invention is to satisfy the long felt, and still unsatisfied need for a near-field optical or MO disk data storage system that uses a catadioptric focusing device or lens having a high numerical aperture (NA), which does not introduce significant spot aberration on the disk.

Another aspect of the present invention is to provide a focusing device that has generally flat surfaces that act as reference surfaces and that facilitate its manufacture and its assembly to the head.

The method of making and self-aligning the head at a wafer level is as follows: A flat optical substrate is molded or heat pressed in batches at wafer level, to form the desired lens shapes. Coil cavities or depressions can be simultaneously formed with the lens to accommodate the coil assembly. Alternatively, the coil cavities or depressions can be formed later by other methods.

Conductive plugs are formed in proximity to the cutting lines for wire bonding attachment to the coil. The plugs are filled with a conductive material such as copper. The plugs do not extend through the entire depth of the optical wafer, thus further facilitating the mass production of the integrated heads.

The slider body wafer is formed from silicon or other appropriate material. The slider body wafer and the lens/coil wafer are bonded. Coils and pedestals are formed on the lens/coil plate using thin-film processing techniques. Reflective surfaces are deposited on the bottom surface of the substrate, opposite the lens. The mirror material around the pedestal areas and plugs is masked and removed.

An alumina layer is then deposited to provide a base for the air bearing surface and the pedestal. Yokes are then formed by means of lithography and plating in the base and sides of the depressions to assume a desired shape. A series of alternating insulating layers and conductive coil layers is formed. A protective layer seals the coil assembly, and is lapped to correct the lens thickness and to provide the proper focal plane and air bearing surface.

The focusing device includes an incident surface, a reflective surface, a focal pedestal, and a body. The incident surface is generally flat and is comprised of a central diffractive, optically transmissive surface (also referred to herein interchangeably as central facet) and a peripheral surface (also referred to herein interchangeably as peripheral facet or reflector). In one embodiment, the peripheral surface is comprised of a reflective-diffractive surface, or alternatively, a reflective-kinoform phase profile.

In use, an incident optical beam, such as a laser beam impinges upon the central surface, and is diffracted thereby. The incident laser beam can be collimated, convergent or divergent. The laser beam passes through the transparent body, and impinges upon the reflective surface. The laser beam is then reflected by the reflective surface, through the body, unto the peripheral surface. The laser beam is reflected only, reflected and diffracted, or diffracted or refracted by the peripheral surface, as a focused beam, through the body, and is focused in a focal point located at, or in close proximity to an edge of the focal pedestal. The focal point is located in very close proximity to the disk such that a localized evanescent field or light interacts with disk, enabling data to be transduced to and from the disk.

BRIEF DESCRIPTION OF THE DRAWINGS

The features of the present invention and the manner of attaining them, will become apparent, and the invention itself will be understood by reference to the following description and the accompanying drawings, wherein:

FIGS. 12 through 22 illustrate the process of manufacturing the head of the present invention.

Similar numerals in the drawings refer to similar or identical elements. It should be understood that the sizes of the different components in the figures might not be in exact proportion, and are shown for visual clarity and for the purpose of explanation.

DETAILED DESCRIPTION OF THE INVENTION

Figure 1:
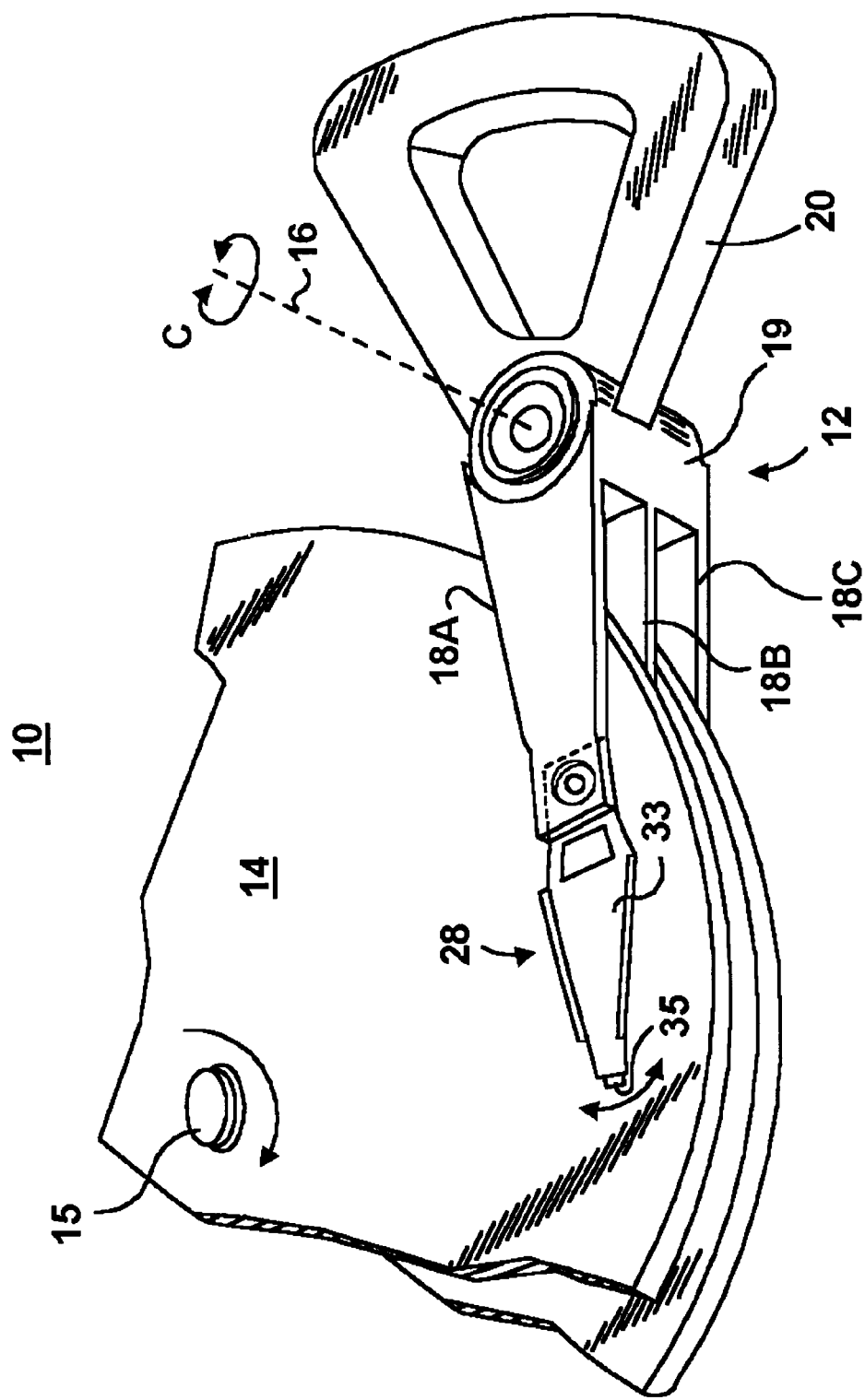
FIG. 1 is a fragmentary perspective view of a data storage system utilizing a read/write head according to the invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. A rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
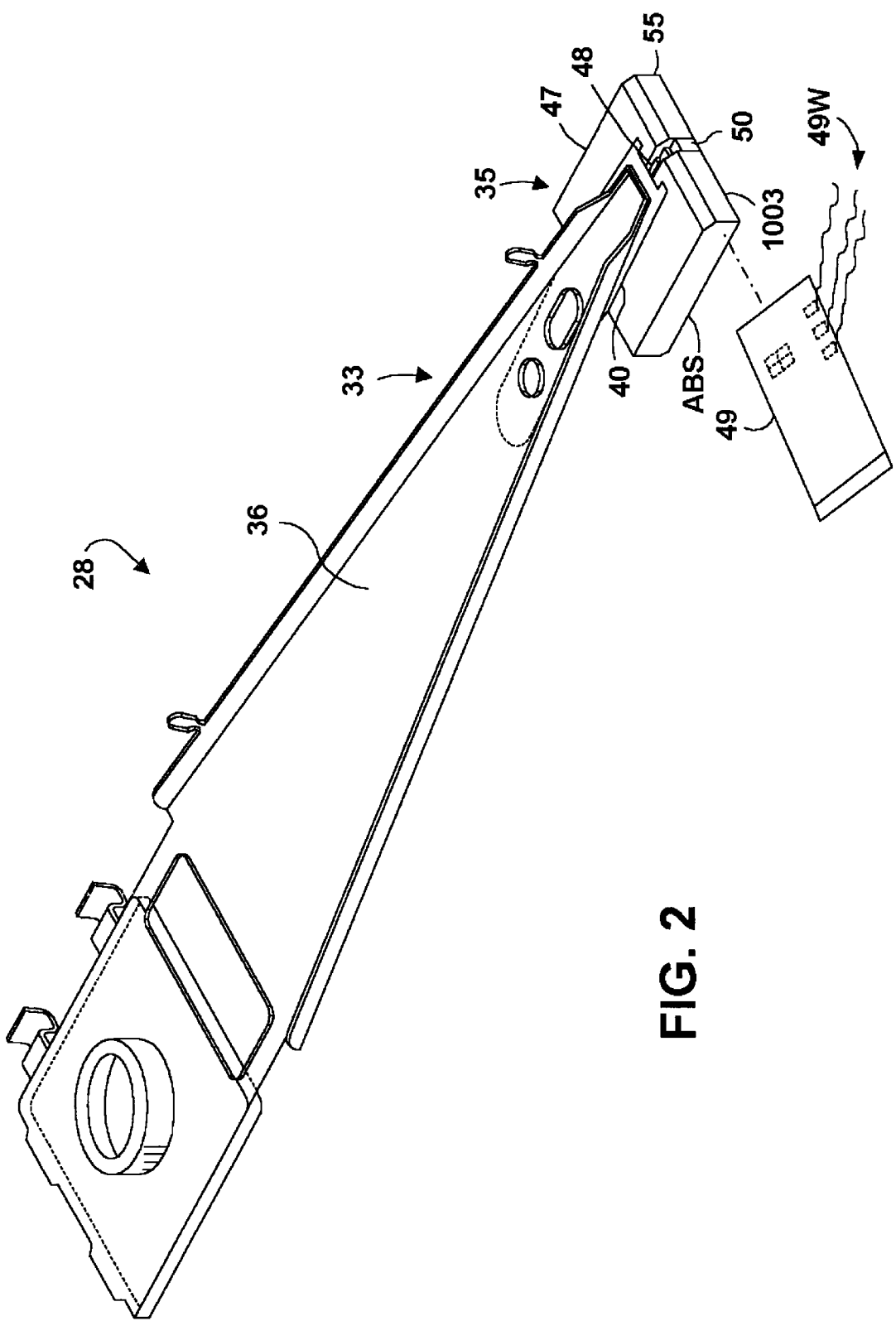
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a load beam 36 and a flexure 40 to which the head 35 is secured.

Figure 23:
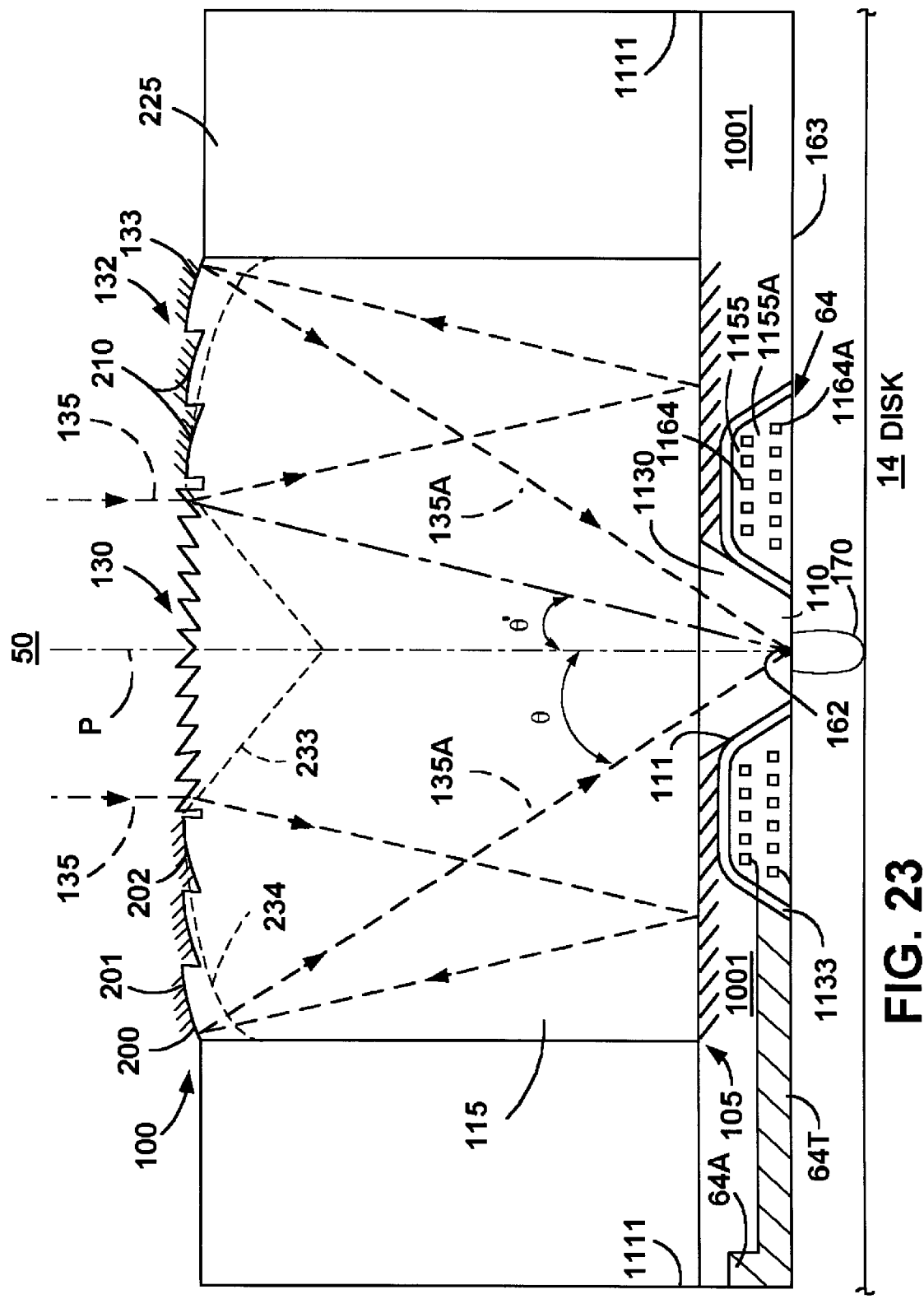
FIG. 23 is an enlarged, side elevational view of a catadioptric focusing device forming part of the write head of FIGS. 1 and 2, made according to the present invention.

In general, the head 35 is formed of a slider body (or slider) 47 secured to the free end of the load beam 36 by means of the flexure 40, and a lens/coil plate 1001 which is secured to the slider 47. The lens/coil plate 1001 comprises a substrate 1003 on (or within) which an optical focusing device or lens 50 is formed on a first (or upper) side 1004 (FIG. 4). With further reference to FIG. 23, the lens/coil plate 1001 further comprises a coil or coil assembly 64 secured to a pedestal (110) edge 163 for generating a desired write magnetic field. As is schematically illustrated by a block drawn in dashed lines in FIG. 3, the coil 64 is formed on (or within) a second (or bottom) side 1006 of the lens/coil plate 1001, opposite, and in alignment with the optical focusing device 50.

Figure 3:
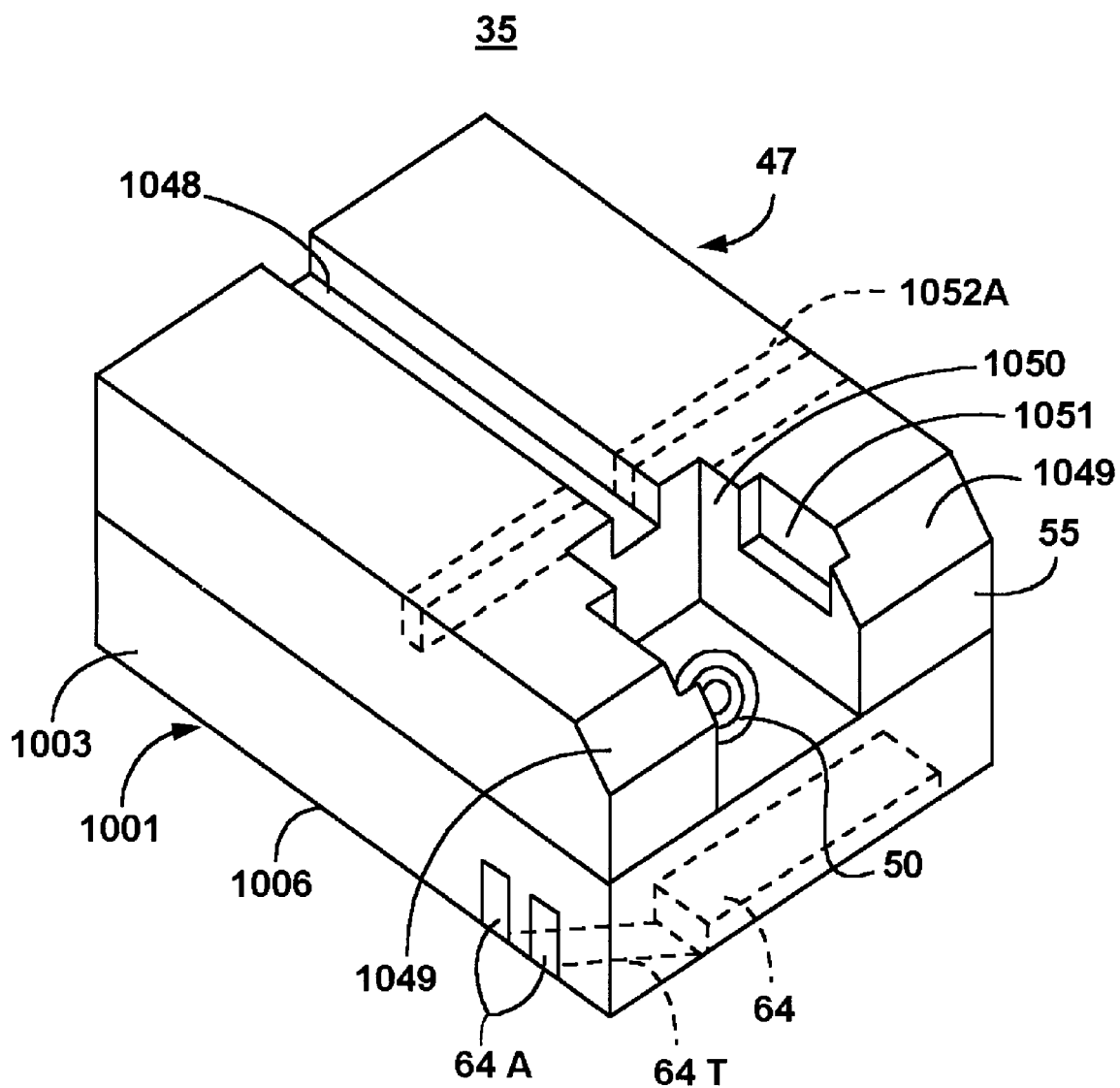
FIG. 3 is an enlarged perspective view of a head showing a focusing device according to the present invention.
Figure 4:
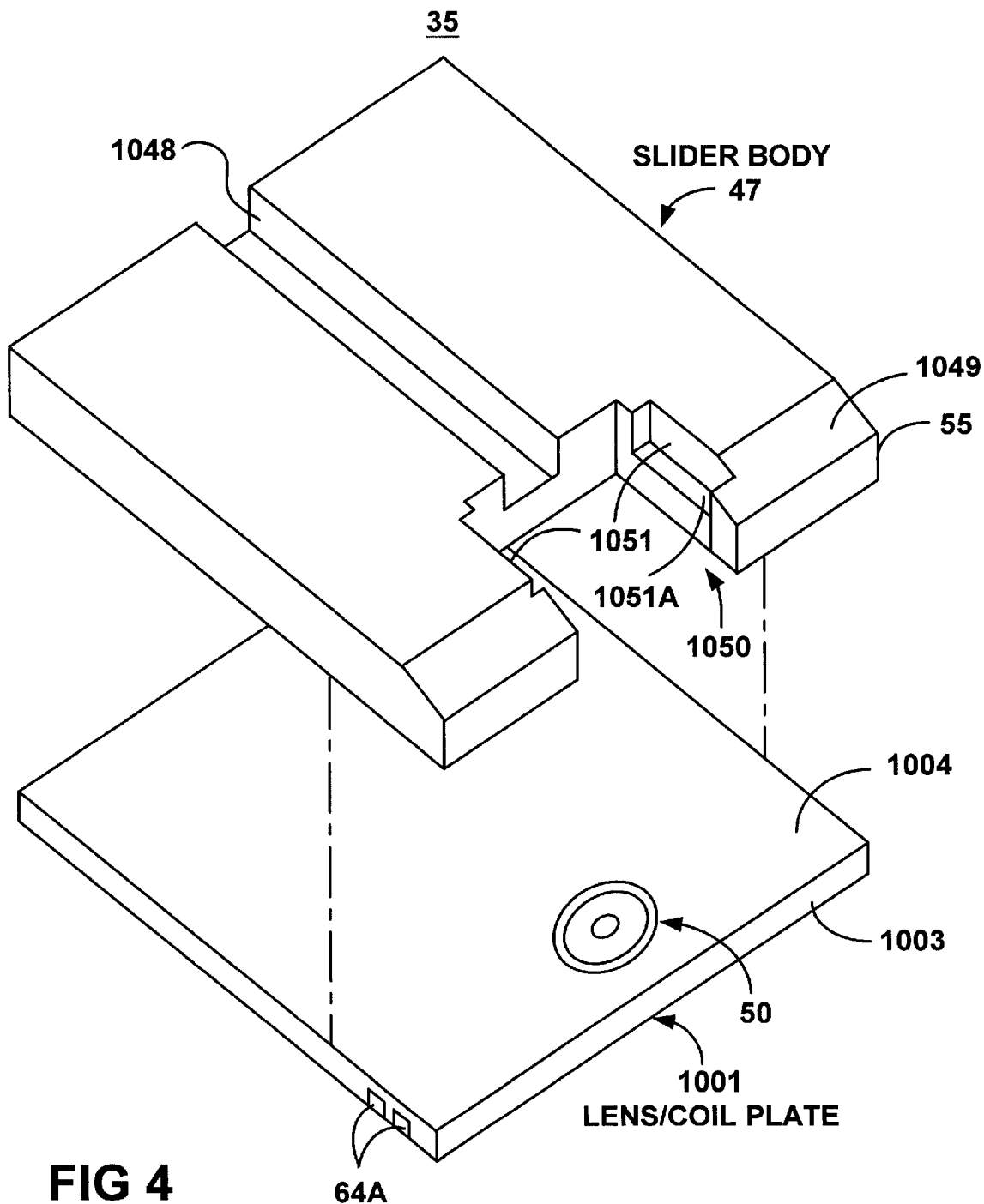
FIG. 4 is an exploded view of the head of FIG. 3, illustrating a slider body, and a lens/coil plate.

With reference to FIGS. 2 through 4, the head 35 further includes an optical beam delivery mechanism, such as a waveguide, a channel, or a fiber 48. A stationary or a micro-machined dynamic reflective surface, such as a mirror 49, is secured to a trailing edge 55 of the slider body 47 at a 45 degree angle relative to the optical beam emanating from the fiber 48, to reflect the optical beam onto the optical focusing device 50, in order to transduce data to and from the storage medium 14 (FIG. 23).

The slider body 47 can be a conventional slider or any other suitable slider. In the present illustration, the slider body 47 includes a fiber channel 1048 for receiving the optical fiber 48. Though the fiber channel 1048 is illustrated as being centrally located, i.e., along a generally central axis of the slider body 47, it should be understood that the location of the fiber channel 1048 can be offset relative to the central axis. In a design where the optical beam is delivered through free space, for example when a fiber is not used, the optical beam can be transmitted through the fiber channel 1048 or a waveguide formed within the fiber channel 1048.

The slider body 47 further includes an optical opening 1050, which in this example, extends from, and is wider than the fiber channel 1048. The optical opening 1050 is formed in the slider trailing edge 55. The slider body 47 also includes two quarter-wave plate notches 1051 (FIG. 4) that are formed symmetrically relative to the optical opening 1050, in two opposite sides of the slider body 47. The quarter wave-plate notches 1051 cooperate to receive and retain a quarter wave-plate or any other suitable optical component 1052 (FIGS. 5–7) that assists in guiding and focusing the optical beam 135 (FIG. 23) emanating from the optical fiber 48.

With particular reference to FIG. 4, each quarter wave-plate notch 1051 is defined by a shelf 1051A on which the quarter-wave plate 1052 rests. According to another embodiment, the shelves 1051A can be eliminated and the quarter-wave plate 1052 can be provided with one or more stands (not shown) to support the quarter-wave plate 1052 on the lens/coil plate 1001 and elevate it above the lens 50.

According to another embodiment, when the optical beam 135 is transmitted through free-space, the quarter-wave plate 1052 and the quarter wave-plate notches 1051 can be eliminated altogether.

A sloped surface 1049 can be formed on one or both sides of the trailing edge 55 relative to the optical opening 1050, in order to support the mirror 49 at the desired angle, for reflecting the optical beam 135 emanating from the fiber 48, through the quarter-wave plate 1052, the optical focusing device 50, and the coil assembly 64, onto the disk 14 (FIG. 23). As illustrated in FIGS. 3 and 4, the optical opening 1050 extends through the entire height of the slider body 47.

Figure 7:
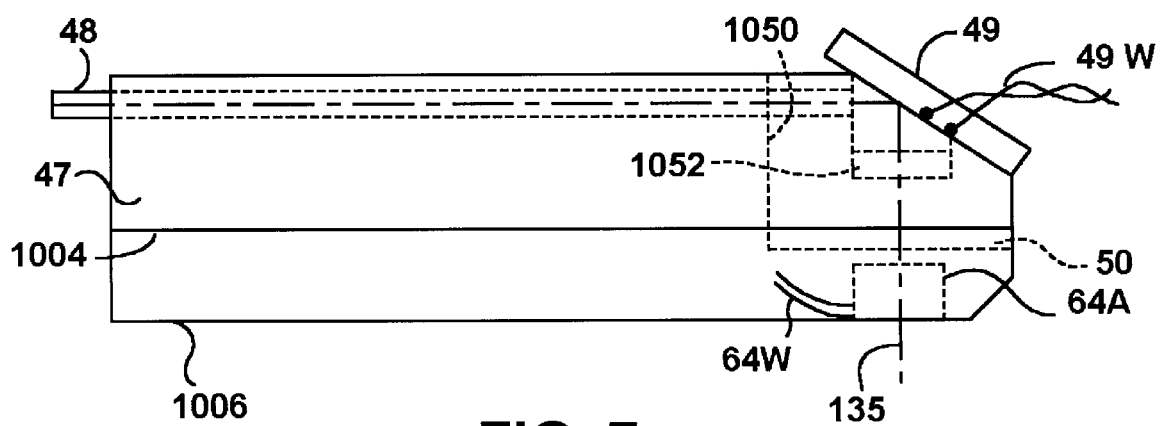
FIG. 7 is a side elevational view of the head of FIGS. 5 and 6.

Optionally, an adhesive relief channel 1052A, shown in dashed lines in FIG. 3, can be formed in the upper surface of the slider body 47, transversely, i.e., at an angle, relative to the fiber channel 1048. The adhesive relief channel 1052 is preferably deeper than the fiber channel 1048, so that excess adhesive flows within the adhesive relief channel 1052, and is thus prevented from overflowing into the optical opening 1050 and from interfering with the optical path of the optical beam 135 (FIG. 7). The fiber 48 (FIG. 5) can be positioned and aligned within the fiber channel 1048 (FIG. 5) by translating it along the length of the fiber channel 1048. Preferably but not necessarily, the tip of the fiber 48 projects within the optical opening 1050. It should be clear that other channels and openings can be patterned within the slider body 47, for example to receive optical components, including but not limited to lenses, beam splitters, etc. to enhance the optical performance of the head 35.

The lens/coil plate 1001 is secured to the slider body 47, such that the optical focusing device 50 (or lens) is positioned substantially underneath the optical opening 1050, in optical alignment with the fiber 48, the mirror 49, the quarter-wave plate 1052, and the coil assembly 64.

Figure 5:
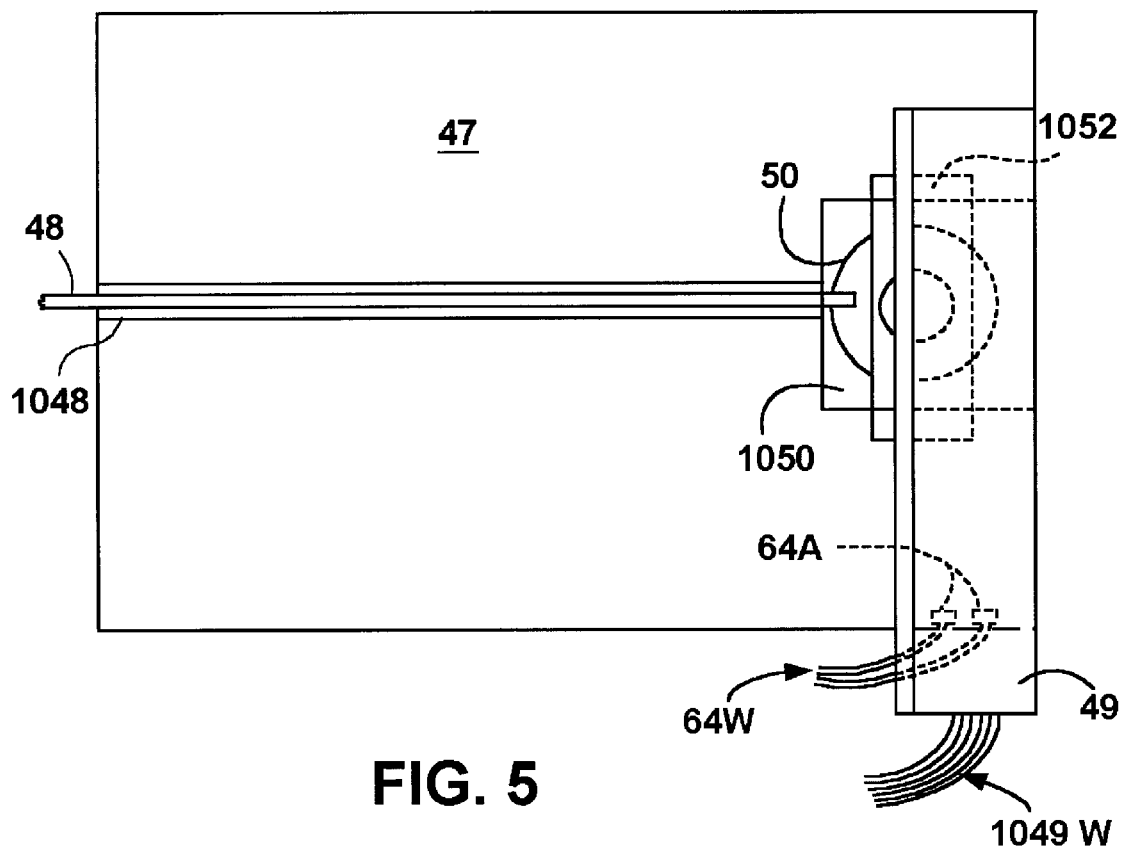
FIG. 5 is a top plan view of the head of FIG. 3, shown assembled to a reflective surface (i.e., mirror), a quarter-wave plate, an optical fiber, coil and mirror wires, and the lens coil plate of FIG. 4.
Figure 6:
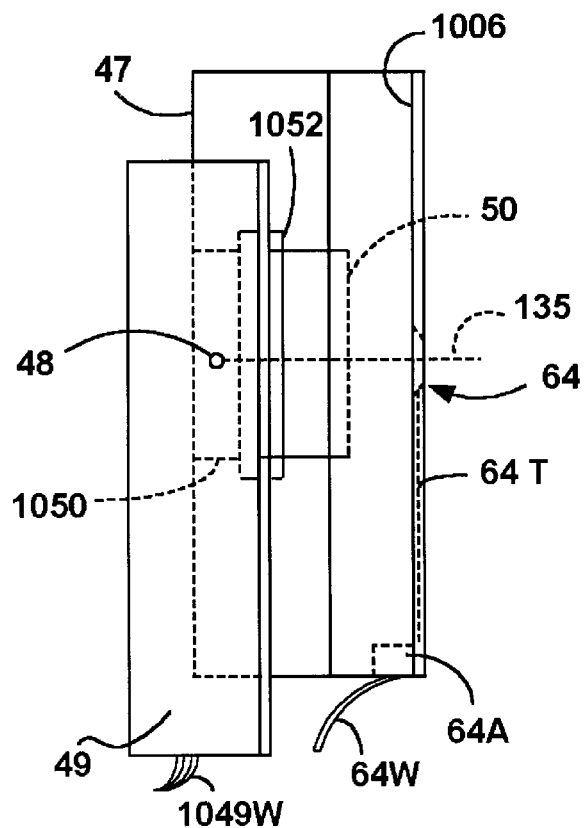
FIG. 6 is a front elevational view of the head of FIG. 5, further illustrating a coil forming part of the lens/coil plate of FIG. 4.

Two contact pads 64A (FIG. 3) are formed in the side of the substrate 1003, as will be described below, for connection to coil wires 64W (FIGS. 5–7). As further illustrated in FIG. 23, wire traces 64T connect the coil assembly 64 and the contact pads 64A. The coil wires 64W conduct an electrical current through the coil assembly 64 for energizing it.

Figure 11:
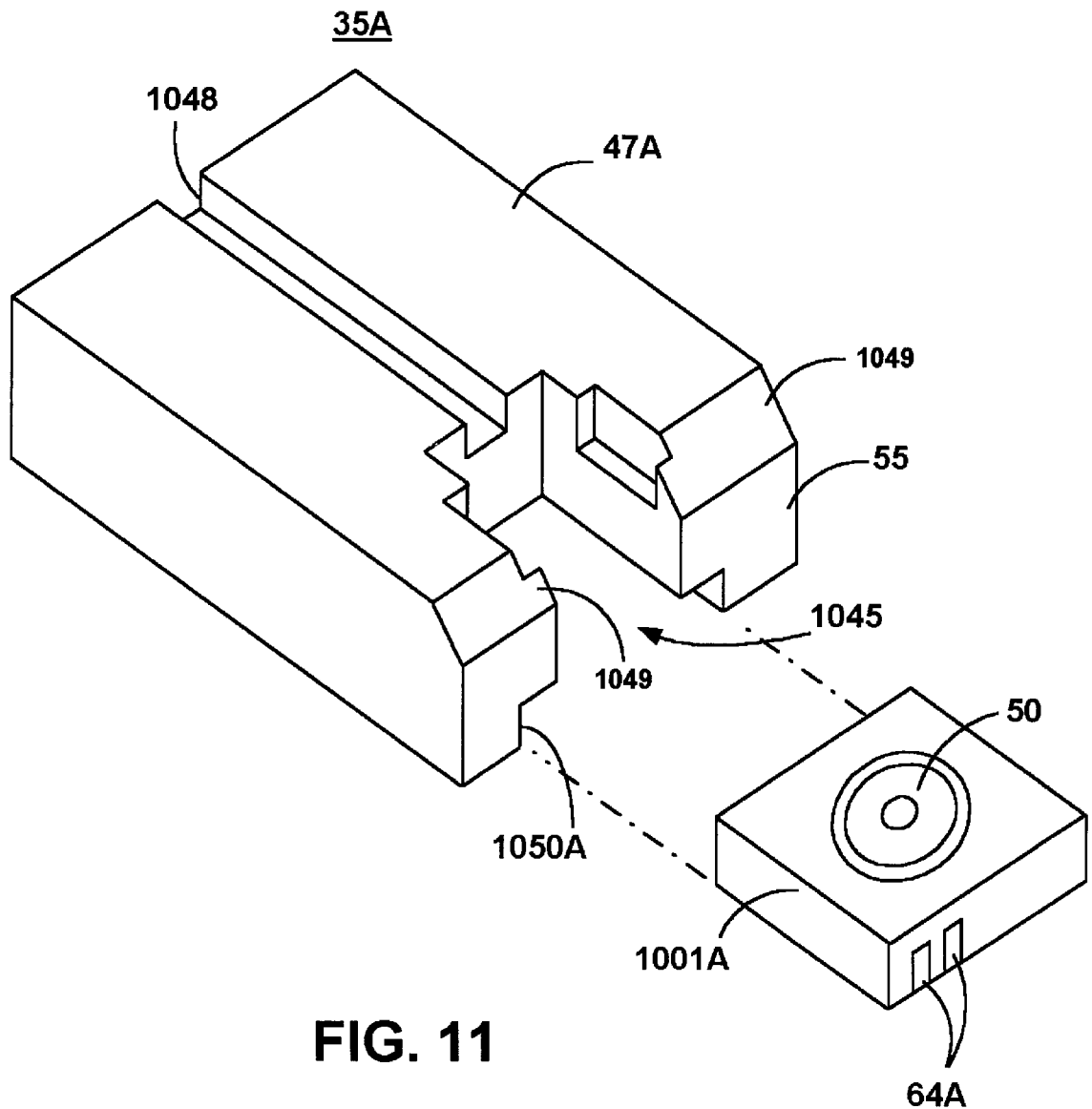
FIG. 11 is a perspective, exploded view of another head design, illustrating a slider body in the process being assembled to an individual focusing device made according to the present invention, and detached from the lens/coil wafer of FIG. 8.

FIG. 11 illustrates another head 35A which is basically similar in function to the head 35. The head 35A includes a slider body 47A that is similar to the slider body 47, with the exception that the slider body 47A includes an opening 1050A for receiving a lens/coil plate 1001A, within or on which the optical focusing device 50 and the coil assembly 64 are formed according to the present invention. In this design, the lens/coil plate 1001A is individually fitted within the opening 1050A and secured to the slider body 47A, for example by means of epoxy.

Figure 8:
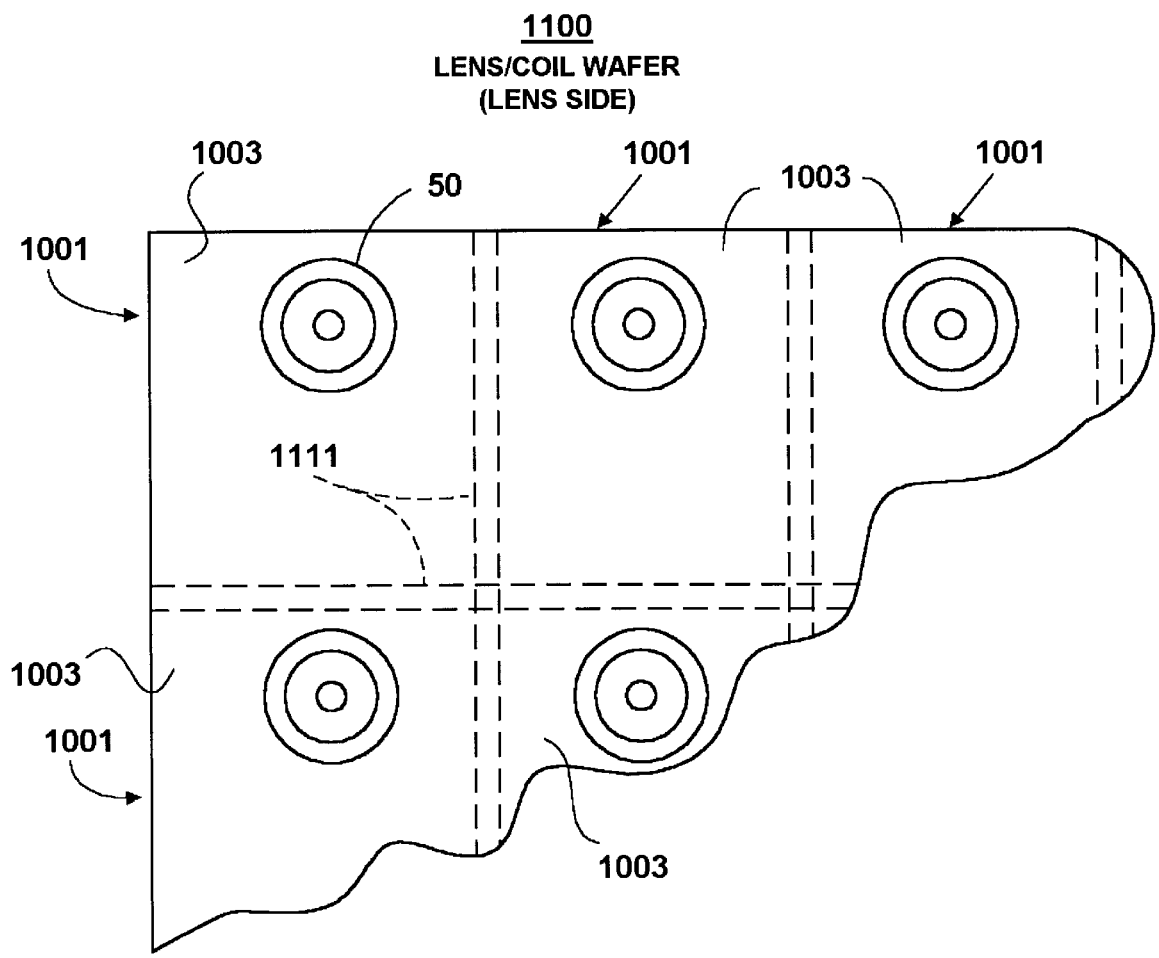
FIG. 8 is a fragmentary, top plan view of a lens/coil wafer, shown from the lens (or focusing device) side, on which a plurality of lens/coil plates of FIG. 4, are formed, and illustrating a plurality of focusing devices.
Figure 9:
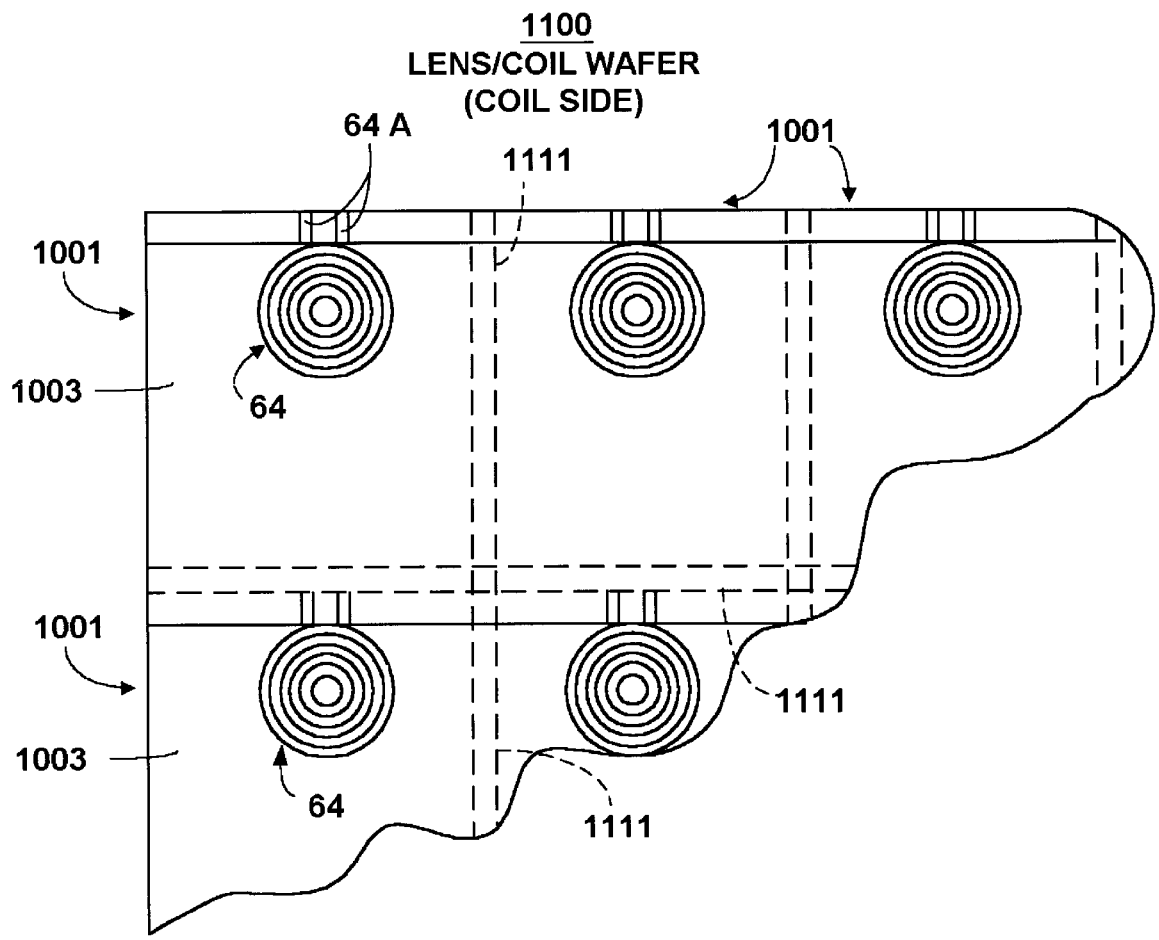
FIG. 9 is a fragmentary, bottom plan view of the lens coil wafer of FIG. 8, shown from the coil side, and illustrating a plurality of coils.

FIG. 8 illustrates a lens/coil wafer 1100, shown from the lens side, on which a plurality of substantially identical lens/coil plates 1001 are formed. FIG. 9 is a bottom plan view of the lens coil wafer 1100 of FIG. 8, shown from the coil side, and illustrating a plurality of coil assemblies 64. The thin-film wafer processing of the lens/coil plate 1001 facilitates the mass production and alignment of the lenses 50 and the coil assemblies 64.

Figure 10:
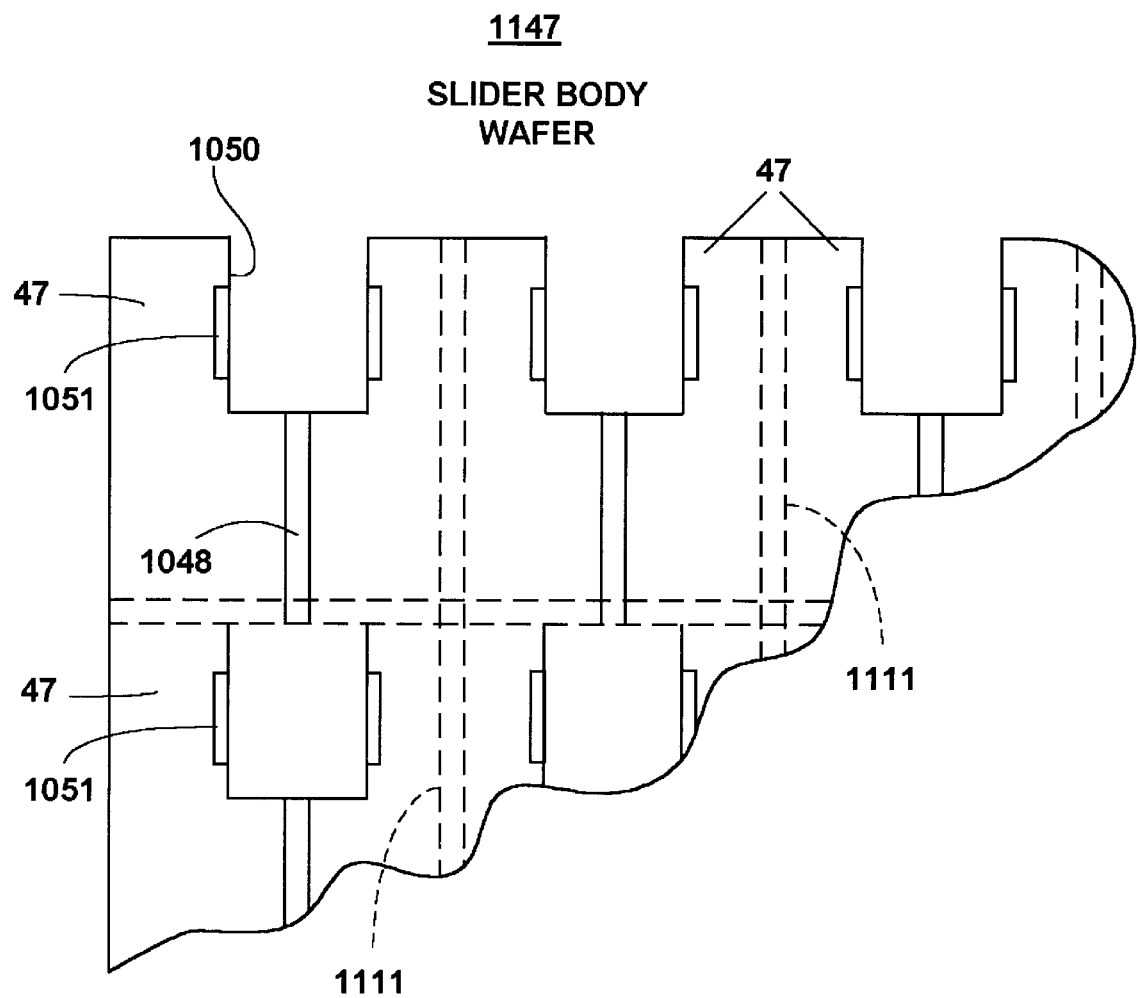
FIG. 10 is a fragmentary, top plan view of a slider body wafer containing a plurality of slider bodies shown in FIG. 4, for assembly to the lens coil wafer of FIGS. 8 and 9.

FIG. 10 illustrates a slider body wafer 1147 containing a plurality of slider bodies 47. The slider body wafer 1147 is assembled to the lens/coil wafer 1100 of FIGS. 8 and 9, by superimposing and aligning the slider body wafer 1147 on the upper surface of the lens/coil wafer 1100 (shown in FIG. 8). Once the two wafers 1147 and 1100 are secured, for example by means of epoxy, sonic bonding, diffusion bonding, anodic bonding, glass fritt bonding, or any other suitable technique, the wafers 1147 and 1100 are sliced into individual, pre-aligned heads 35, along lines 1111 (shown in dashed lines). Referring to FIGS. 6 and 7, the coil wires 64W are then connected to the contact pads 64A, and each head 35 is thereafter fitted with an optical fiber 48, a mirror 49 and a quarter wave-plate 1052.

The method of making and self-aligning the head 35 at a wafer level (without the optical fiber 47, mirror 49, or quarter wave-plate 1052) will now be explained in connection with FIGS. 12 through 22.

A flat glass (or optical) substrate or sheet is molded or pressed either individually, or in batches at a wafer level, as shown for example in FIGS. 15 through 18, to form the lens shapes illustrated, for example in FIGS. 19 through 22. Other lens shapes, such as the shapes shown and described herein can be formed as well using similar techniques.

According to one embodiment, lens caps 1150 (FIGS. 21, 22) are formed separately from, and then secured to the optical substrate by means of suitable techniques, including but not limited to epoxy. The lens caps 1150 can, for example, be UV cured to the optical substrate 1110A.

With reference to FIGS. 19, 20, and 23, the central facet 130 includes patterns 200, 201, 202 that are formed as integral parts of the lens 50 by means of heat pressing, molding processes, or other suitable processes. These lens patterns 200, 201, 202 can alternatively be formed, for example, by photopolymer deposition onto the substrate, followed by forming and etching, including gray scale masking. In some embodiments, the lens patterns 200, 201, 202 are substantially flat, while in other embodiments, the lens patterns 200, 201, 202 assume various appropriately designed shapes to suit specific applications and lens designs.

With reference to FIGS. 19 and 21, coil cavities 64C can be simultaneously formed with the lens patterns, or later by other methods, in order to accommodate the coil assembly 64. Conductive plugs or vias 1125 (FIG. 19) are formed in close proximity to, or in contact with the cutting lines 1111, for subsequent wire bonding attachment to the coil 64. The plugs 1125 are filled with a conductive material such as copper. Upon separation of the individual heads 35 (FIG. 23) along the cutting lines 1111, the plugs 1125 (FIG. 19) become exposed and are referred to as contact pads 64A. As illustrated in FIGS. 4 and 6, the contact pads 64A are then secured to coil wires 64W.

According to one embodiment of the present invention, the plugs 1125 have an arc (or wedge) shape cross section, for preventing the copper filling 1125C from being detached or removed from the plugs 1125 when the wafers are sliced into individual heads 35. In a preferred embodiment, the plugs 1125 do not extend through the entire depth of the optical wafer, so as to further facilitate the mass production of the integrated heads 35.

Figure 12:
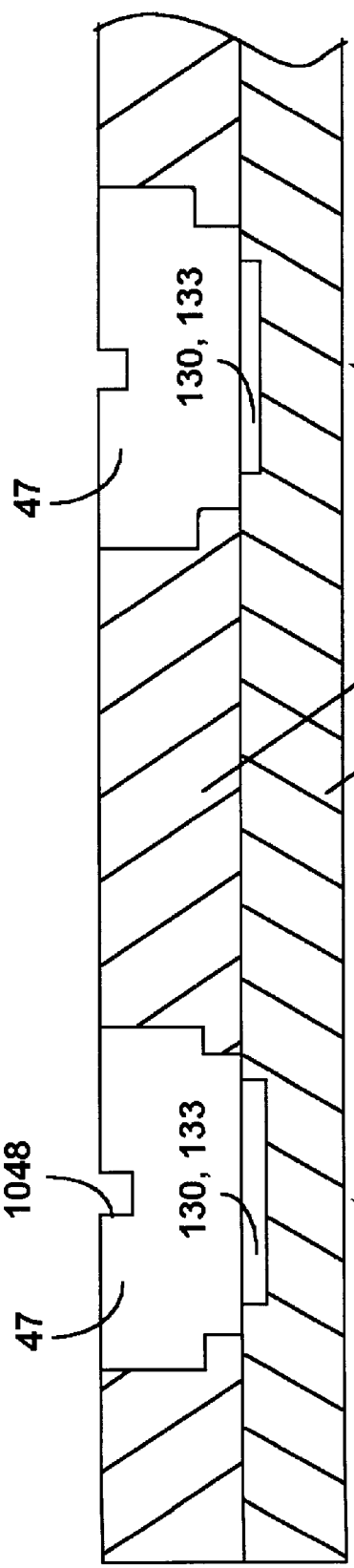
Figure 13:
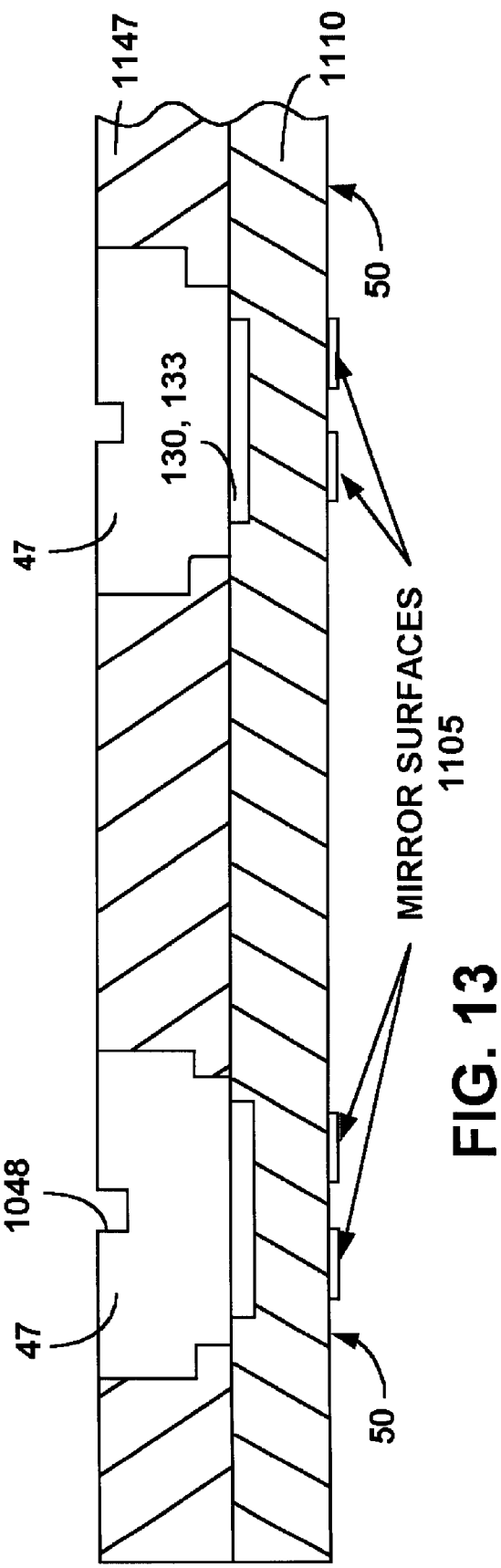

With reference to FIGS. 10, 12, and 13, the slider body wafer 1147 can be formed, for example, of silicon. It should be noted that the etching, machining or forming of the fiber channel 1048 can be done subsequent to bonding the slider body wafer 1147 to the lens/coil wafer 1110. The slider body wafer 1147 and the lens/coil wafer 1110 are bonded, using known or available techniques such as: anodic bonding, diffusion, glass bonding using for example glass fritt, or adhesive bonding such as epoxy.

A reflective surface or mirror 1105 is deposited at the bottom surface of the lens/coil wafer 1110 (opposite the lens patterns, e.g. 1150A, 130, 200, 201, 202). If a reflective material were deposited around the pedestal 110 and the plugs 1125, then it is masked and removed.

Figure 14:
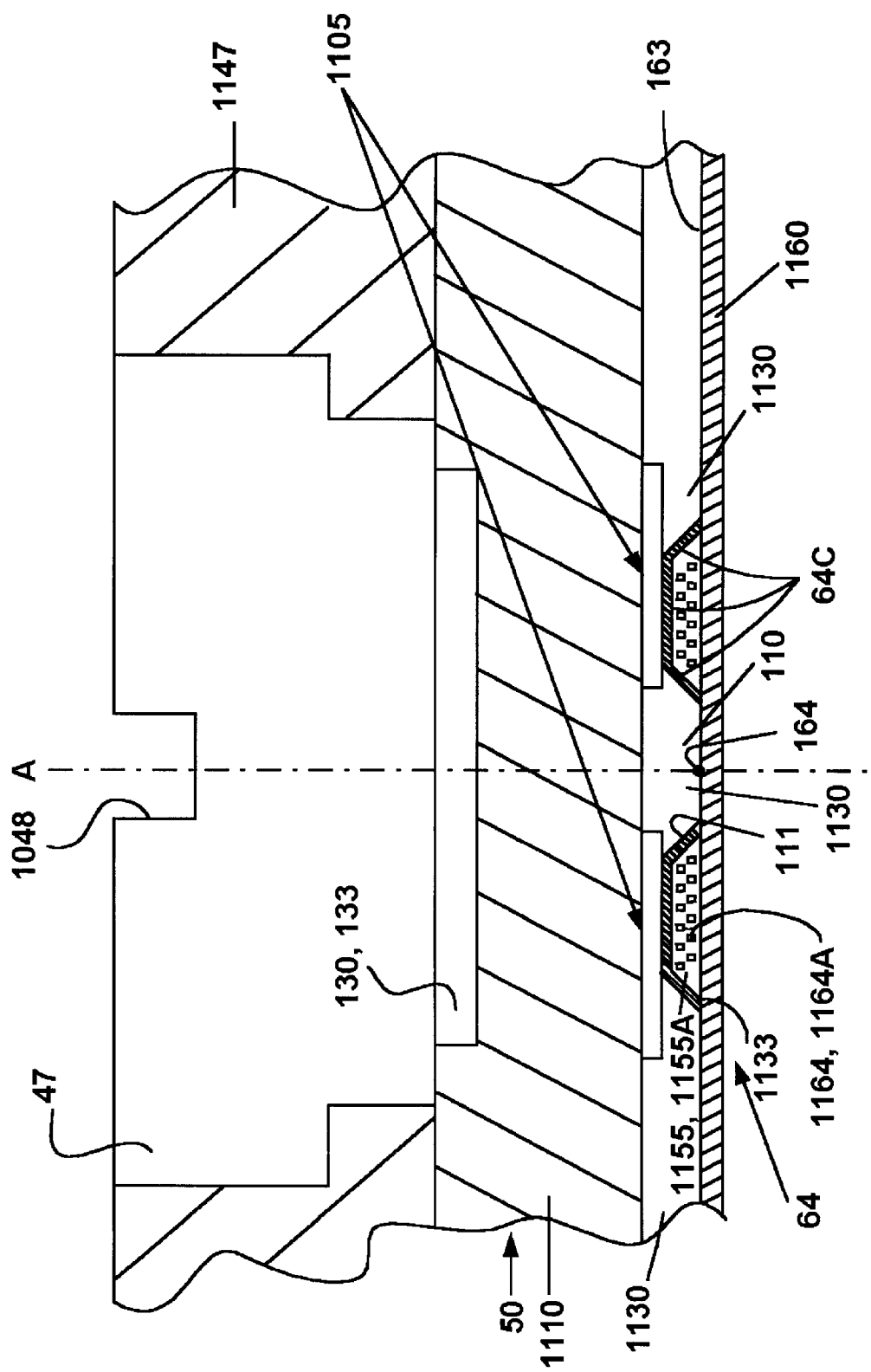
Figure 17:
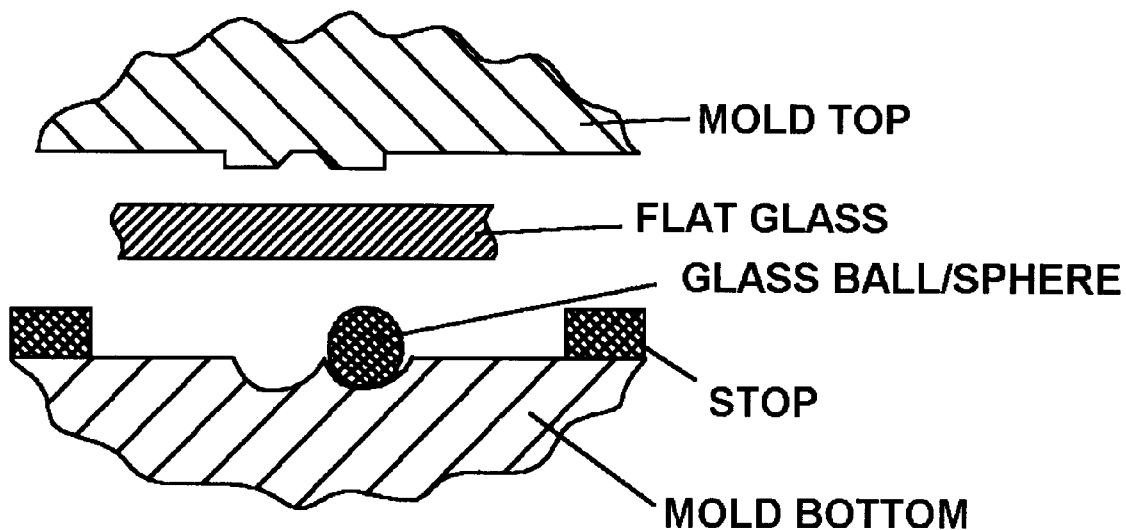
Figure 18:
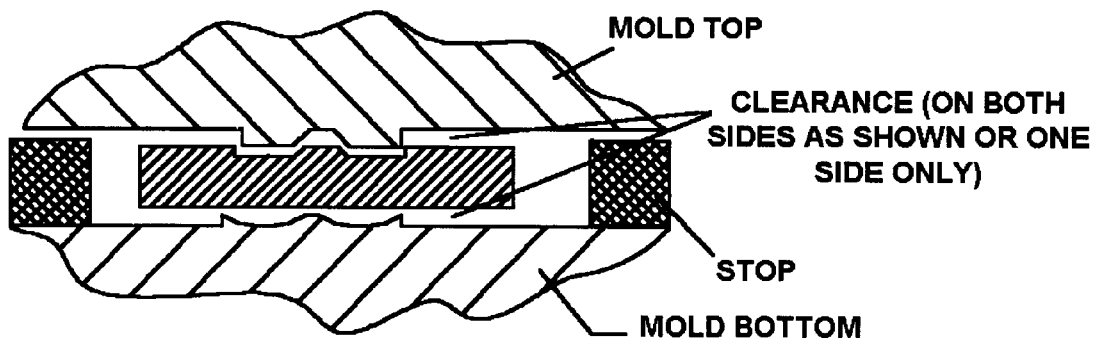

With reference to FIG. 14, a pedestal (or pedestal area) 110 and a coil 64 are then formed on the lens/coil plate 1110 using thin-film processing techniques. In one embodiment the pedestal 110 is formed separately from the lens/coil substrate 1110, while according to another embodiment the pedestal 110 is formed as part of the lens/coil substrate 1110. FIGS. 14 and 23 illustrate a pedestal 110 formed by depositing a layer of transparent material 1130, such as alumina, on the lens/coil substrate 1110 to form the pedestal 110, and to form the cavity or depression 64C (FIG. 19) within which the coil 64 is formed.

The pedestal 110 is shaped appropriately, as desired. In an exemplary preferred embodiment illustrated in FIGS. 14 and 23, the pedestal 110 has a sloped outer side 111 so that the conductors of the coil 64 can be formed in closer proximity to a central axis P, along the optical path of the beam 135. According to another embodiment, the pedestal 110 is formed integrally with lens body 115, and extends below the bottom reflective surface 105.

The steps of forming the coil 64 and the pedestal 110 can be carried out either before or after the slider body wafer 1147 and the lens/coil wafer 1110 are secured together. With reference to FIG. 14, the centers of the fiber channel 1048 and the pedestal 110 are preferably co-aligned with the central axis P and the optical path of the beam 135.

Yoke or flux gathering layers 1133 are then formed by means of lithography and plating in the base and sides of the depressions 64C (FIG. 14), to assume a desired shape. In a preferred embodiment, the yoke 1133 covers multi-layered coil conductors 1164A to optimize the collected magnetic field.

With reference to FIG. 23, an insulating layer 1155 is formed on the yoke 1133, and a first layer of coil conductors 1164 is deposited on the insulating layer 1155 by means of, for example, lithography and plating. A second insulating layer 1155A is then formed on the first layer of coil conductors 1664, and a second layer of coil conductors 1664A is deposited thereon. These steps are repeated until the desired number of coil layers is reached.

A protective layer 1160 (FIG. 14) of insulating and transparent material can optionally be deposited on the final coil layer to provide a protective seal to the coil assembly 64. An alternative approach to forming the coil cavity 64C is to heat press it into the glass wafer as shown in FIGS. 15, 16, 18, 19, 21. Such heat pressing step will precede the step of depositing the reflective surfaces 1105.

The protective layer 1160 is lapped to correct for the lens thickness and to define the proper air bearing surface ABS contour of the slider body 47. The ABS can additionally, or alternatively be formed, by for example etching the protective layer 1160. The heads 35 are then sliced or etched away from the wafer, into individual heads 35. The quarter wave plate 1052, mirror 49, mirror wires 1049W, coil wires 64W, and optical fiber 48 are then assembled to the head 35 and properly aligned, to complete the manufacture of the head 35. The head 35 is then assembled to the suspension 33 as is known in the field to form the HGA 28 (FIG. 2).

The details of the optical focusing device 50 will now be described with reference to FIG. 23. The optical focusing device 50 includes an incident surface 100, a bottom reflective surface 105, the pedestal 110, and a body 115. The incident surface 100 is generally flat and is comprised of a central facet 130 and a peripheral reflector 132.

In one embodiment, the central facet 130 is diffractive and optically transmissive, and the peripheral reflector 132 includes a diffractive or kinoform phase profile 133. The body 115 is optically transparent, and the incident surface 100 is formed on a first side of the body 115. The bottom reflective surface 105 is formed on a second side of the body 115, with the first and second sides being preferably oppositely disposed. The pedestal 110 is formed on the same side as the bottom reflective surface 105.

In a data writing mode, an incident optical beam, such as a laser beam 135 impinges upon the central facet 130, and is diffracted thereby. The incident laser beam 135 can be collimated, convergent or divergent. The laser beam 135 passes through the transparent body 115, and impinges upon the bottom reflective surface 105. The laser beam 135 is then reflected by the bottom reflective surface 105, through the body 115, onto the peripheral reflector 132. The laser beam 135 is then either reflected, refracted, diffracted, reflected and refracted, or reflected and diffracted by the peripheral reflector 132 as a focused beam 135A through the body 115, and is further focused to a focal point 162 located within or on the surface of the pedestal 110 at, or in close proximity to an edge or surface of the pedestal 110 that defines a focal plane 162P. In a preferred embodiment, the focal point 162 is located at the central axis P, in very close proximity to the disk 14, such that a localized evanescent field or light 170 interacts with disk 14, for enabling data to be transduced to and from the disk 14.

The focused beam 135A defines an angle of incidence θ with a central axis P. It should be clear that the angle of incidence θ is greater than the angle of incidence θ' because the optical beam 135 has undergone the sequence of reflection, refraction, and/or diffraction as explained herein. Consequently, the NA of the optical focusing device 50 exceeds that of a conventional objective lens, as supported by the following equation:

$$NA = n \cdot \sin\theta,$$

where n is the index of refraction of the lens body 115. According to the present invention, it is now possible to select the lens body 115 of a material with a high index of refraction n, in order to increase NA.

In one embodiment, the peripheral surface is formed of a profile 133, for example a kinoform phase profile that defines a pattern of refractive profiles i.e., 200, 201, 202. While only three refractive profiles are illustrated, it should be understood that a greater number of refractive profiles can be selected. The pattern of refractive profiles 200, 201, 202 is coated with a reflective layer 210. In another embodiment, the peripheral kinoform phase profile 133 can be replaced with an appropriate diffractive grating or profile, or with an appropriate lens structure such as a Fresnel lens.

With reference to FIG. 23, the optical focusing device 50 is generally cylindrically shaped with a circular cross-section, and is formed within a substrate 225. The substrate 225 facilitates the handling of the optical focusing device 50. The central facet 130 is concentric relative to, and is disposed within the reflective layer 210. The central facet 130 can simulate holographic (or virtual) flat, spherical, conical, a spherical or other suitable diffractive surfaces 233 (shown in dashed lines in FIG. 23), while retaining its generally flat configuration. The reflective layer 210 is ring shaped. In an alternative design, the kinoform phase profile can simulate an a spherical refractive or diffractive surface 234 (shown in dashed lines in FIG. 23), while retaining its generally flat configuration.

The pedestal 110 can be generally conically (defined by edge 111), cylindrically shaped, or it can have a trapezoidal (or another suitable) cross-section, and is co-axially and concentrically disposed relative to the bottom reflective surface 105. In an alternative embodiment, the central facet 130 includes an alignment ring that assists in the alignment of the optical focusing device 50 during assembly to the slider body 47.

As explained herein the optical focusing device 50 can be made using molding, etching, or other suitable manufacturing techniques. The flatness of the incident surface 100 helps facilitate wafer processing techniques to be used to mass assemble a lens wafer in which a plurality of optical focusing devices 50 are formed, to a slider wafer in which a plurality of sliders 47 are formed.

Using the present optical focusing device 50, it is possible to reduce the size of the focal spot 162 (FIG. 23) to 0.3 micron or less. The optical focusing device 50 can be made of any suitable transparent material, including but not limited to glass, crystal, plastic, or a combination thereof.

Though exemplary dimensions of the focusing device 50 are illustrated in FIG. 23, within an acceptable range, it should be clear that these dimensions can be scaled as desired for the intended applications.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment. For example, refractive or diffractive gratings can be added to the bottom reflective surface, as explained herein in connection to the incident surface. The use of the optical focusing device is not limited to data storage devices, as it can be used in various other optical applications, including but not limited to high resolution microscopy, surface inspection, and medical imaging.

What is claimed is:

1. A method of making an optical device comprising:
   forming a plurality of slider bodies on a slider wafer;
   forming a plurality of lens plates on a lens wafer;
   positioning said slider wafer relative to said lens wafer so that at least one slider body is in registration with a corresponding lens plate; and
   securing said at least one slider body to said corresponding lens plate to define the optical device.

2. A method according to claim 1, further including separating the optical device from said slider wafer and said lens wafer along a cutting line.

3. A method according to claim 2, further including forming a thin-film coil on at least one of said lens plates.

4. A method according to claim 3, wherein forming said at least one lens plate includes forming a pedestal; and
   forming said coil around said pedestal.

5. A method according to claim 1, wherein forming said plurality of lens plates includes forming at least one generally flat optical substrate corresponding to one slider body.

6. A method according to claim 5, wherein forming said plurality of lens plates further includes forming a plurality of optical patterns on an upper side of said optical substrate.

7. A method according to claim 6, wherein forming said optical substrate includes molding glass into a sheet.

8. A method according to claim 6, wherein forming said optical substrate includes molding a sheet of glass.

9. A method according to claim 6, wherein forming said optical substrate includes heat pressing said upper side.

10. A method according to claim 6, wherein forming said optical patterns includes molding said upper side to form said optical patterns.

11. A method according to claim 6, wherein forming said optical patterns includes using photopolymer deposition of optical material onto said upper side of said optical substrate.

12. A method according to claim 4, wherein forming said coil includes forming a coil cavity around said pedestal.

13. A method according to claim 3, further including forming at least one conductive plug in close proximity to said cutting line, for bonding attachment to said coil.

14. A method according to claim 13, further including filling said at least one conductive plug with electrically conductive material.

15. A method according to claim 4, wherein forming said pedestal includes forming said pedestal separately and then securing said pedestal to a bottom side of said lens plate.

16. A method according to claim 4, wherein forming said pedestal includes depositing a layer of transparent material on a bottom side of said lens plate.

17. A method according to claim 16, wherein forming said pedestal includes forming a sloped outer side around which said coil is formed.

18. A method according to claim 4, wherein forming said coil includes forming a magnetic yoke that covers multi-layered coil conductors.

19. A method according to claim 1, further including forming a reflective surface on a bottom side of said lens plate.

20. A method according to claim 1, wherein forming said plurality of lens plates includes forming a generally flat incident surface comprised of a central facet and a peripheral reflector; and
   wherein said central facet is optically transparent, and said peripheral reflector is any one of: reflective, reflective and diffractive, or reflective and refractive.

21. A method of making a data storage head includes:
   forming a slider with an optical device by:
      forming a plurality of slider bodies on a slider wafer;
      forming a plurality of lens plates on a lens wafer;
      positioning said slider wafer relative to said lens wafer so that at least one slider body is in registration with a corresponding lens plate; and
      securing said at least one slider body to said corresponding lens plate to define the optical device; and
   securing said slider to a load beam.

* * * * *